United States Patent
Chen (10) Patent No.: US 9,880,389 B2
(45) Date of Patent: Jan. 30, 2018

(54) SEPARATE HEAD-UP DISPLAY DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

(*) Notice: Subject to any disclaimer, the term of this patent is extended or adjusted under 35 U.S.C. 154(b) by 26 days.

(21) Appl. No.: 15/068,040

(22) Filed: Mar. 11, 2016

(65) Prior Publication Data
US 2017/0261754 A1 Sep. 14, 2017

(51) Int. Cl.
*G02B 27/01* (2006.01)
*B60K 35/00* (2006.01)

(52) U.S. Cl.
CPC .......... *G02B 27/0179* (2013.01); *B60K 35/00* (2013.01); *G02B 27/0101* (2013.01); *G02B 27/0149* (2013.01); *B60K 2350/405* (2013.01); *B60K 2350/941* (2013.01); *G02B 2027/0156* (2013.01); *G02B 2027/0169* (2013.01); *G02B 2027/0181* (2013.01); *G02B 2027/0196* (2013.01)

(58) Field of Classification Search
CPC ............ G02B 27/0179; G02B 27/0101; G02B 27/0149; B60K 35/00
See application file for complete search history.

(56) References Cited

U.S. PATENT DOCUMENTS

| 4,936,533 | A  | * | 6/1990 | Adams ...................... | B60R 1/04 248/222.11 |
| 2003/0080539 | A1 | * | 5/2003 | Thompson ........... | B60Q 1/0483 280/727 |
| 2005/0085100 | A1 | * | 4/2005 | Wada ........................ | B60R 1/04 439/34 |
| 2015/0212323 | A1 | * | 7/2015 | Kobayashi ............. | B60K 35/00 359/630 |
| 2016/0062117 | A1 | * | 3/2016 | Imasaka ............. | G02B 27/0101 345/7 |

* cited by examiner

*Primary Examiner* — Kevin M Nguyen
(74) *Attorney, Agent, or Firm* — Guice Patents PLLC (57) ABSTRACT

The present invention relates to a separate head-up display device, an adhesive paste set on a bottom side of the base of a display module is provided to adhere on a windshield, to reduce shakes that a reflective sheet of a reflective sheet adjustment module is fixed on the dashboard and the windshield, and rotary joint structures are further set between the display module and the reflective sheet adjustment module, so that a driver may easily adjust the direction of the reflective sheet to obtain an optimal viewing angle, to thereby improve driving safety.

15 Claims, 10 Drawing Sheets

SEPARATE HEAD-UP DISPLAY DEVICE

BACKGROUND OF THE INVENTION a) Field of the Invention

The present invention relates to a separate head-up display device and, more particularly, to a head-up display device for removing shakes and easily adjusting a direction of a reflective sheet, so that a driver may easily adjust the direction of the reflective sheet to obtain an optimal viewing angle, to thereby improve driving safety.

b) Description of Prior Art

There are more and more information in vehicles, accidents may happen if drivers moves line of sight from the road during driving. A head-up display device is provided for drivers to see the road ahead simultaneously during reading information, especially a head-up display device using a concave mirror to form a virtual image, which may be provided to enlarge the displayed area and the distance of the displayed image is enough, usually larger than 2 meters, so that drivers' focal length of reading displayed information is similar to focal length of watching road condition ahead, therefore drivers may take care the road condition during reading information, dangerous of driving may be greatly reduced.

The principle of virtual imaging applied in head-up display device is that a concave mirror is used for imaging. Concave mirror imaging equation is: $1/p+1/q=1/f$; wherein f: focal length, q: object distance, p: image distance. Under a general magnification, virtual images may be enlarged, and the distance of the virtual image may become far at the same ratio. The best ratio for readers is about 4 to 6 times, readers may easily feel dizzy if magnification is too large. If we want the distance between the virtual image and driver's eyes larger than 2 meters, image may be formed in rear of the reflective sheet about 1.2 meters, it means that the optical distance from the display to the concave mirror is larger than 24 cm (if the magnification is five times). The distance of light path could be increased by multiple reflections back and forth between mirrors, but the volume needed by the light path is large. Usually, a space is special arranged inside the dashboard for installing a head-up display device.

The related technology may be referred to the cited references TW patent no. M426681, M463217, M525111, M439181, M464668, M468454, 1326652 and TW publication no. 201122548, 201144861, 201400329. Use of technology of head-up display devices has already disclosed in the cited references, but the following drawbacks are existed in use commonly:

1. For after market, the space on the dashboard is not enough for installing the head-up display device because the volume needed by the light path is too large that may obstruct the line of sight of drivers.

2. For solving the problem that the volume needed by the light path is too large, another method is using a separate way for this structure, namely, the display screen is fixed on an upper portion of the windshield and the reflective sheet is fixed on the dashboard. However, in many vehicles, the dashboard may shake due to operation of an engine or an air-conditioning compressor, this kind of shake may let the reflective sheet fixed above shake together, and displacement of shakes may be enlarged at the magnification due to the magnification effect of the concave mirror, so that the display screen may be shaken severely.

SUMMARY OF THE INVENTION

In view of the drawbacks of the conventional ones, the inventor finally completed the separate head-up display device of the present invention after numerous improvements, namely, the object of the present invention is to provide a head-up display device for removing shakes and easily adjusting a direction of a reflective sheet, so that a driver may easily adjust the direction of the reflective sheet to obtain an optimal viewing angle, to thereby improve driving safety.

To achieve the object, the first embodiment of the separate head-up display device of the present invention, including:

a display module, which includes a display unit, a base and a circuit board, the display unit electrically connected to the circuit board is provided to receive images output from the circuit board and project images;

a reflective sheet adjustment module, which includes a reflective sheet and a base plate, a first joint unit is set on a side of the reflective sheet, a second joint unit is set on a side of the base plate, the second joint unit and the first joint unit are engaged together to form a first rotary joint.

The base, an adhesive paste is set on its bottom side for adhering on a windshield, and a chute set above the base is provided for the display unit to slide fixedly.

The display module further includes a control unit, a wireless unit, a speaker unit and a voice picking unit, each unit is electrically connected to the circuit board.

The base, an adhesive paste set on its bottom side is adhered on a windshield.

The first rotary joint is a universal steering joint, the first joint unit is a spherical structure, and the second joint unit is a concave structure.

The reflective sheet is a concave mirror with translucent and semi-reflective effect.

The second embodiment of the separate head-up display device of the present invention, including:

a display module, which includes a display unit, a base and a circuit board, the display unit electrically connected to the circuit board is provided to receive images output from the circuit board and project images;

a reflective sheet adjustment module, which includes a reflective sheet, a base plate and a support arm, a first joint unit and the third joint unit are set on a side of the reflective sheet, a second joint unit is set on a side of the base plate, the second joint unit and the first joint unit are engaged together to form a first rotary joint.

The support arm, a fourth joint unit is set on its front end, the fourth joint unit and the third joint unit are engaged together to form a second rotary joint.

The base, an adhesive paste is set on its bottom side for adhering on a windshield, and a chute set above the base is provided for the display unit to slide fixedly.

The display module further includes a control unit, a wireless unit, a speaker unit and a voice picking unit, each unit is electrically connected to the circuit board.

The reflective sheet is a concave mirror with translucent and semi-reflective effect.

The base, an adhesive paste set on its bottom side is adhered on a windshield.

The base, a magnetic metal sheet is set on it, a magnet is set on a rear end of the support arm.

The base plate, a slide rail is set on it, and the rear end of the support arm is embedded into the slide rail of the base plate.

The first rotary joint is a universal steering joint, the second rotary joint is a universal steering joint, the first and third joint units are spherical structures; the second and fourth joint units are concave structures.

The first rotary joint is a universal steering joint, the second rotary joint is a universal steering joint, the first and fourth joint units are spherical structures; the second and third joint units are concave structures.

The third embodiment of the separate head-up display device of the present invention, including:

a display module, which includes a display unit, a base and a circuit board, the display unit electrically connected to the circuit board is provided to receive images output from the circuit board and project images;

a reflective sheet adjustment module, which includes a reflective sheet, a base plate, a support arm and a sliding element, a first joint unit and a third joint unit are set on a side of the reflective sheet, a second joint unit is set on a side of the base plate, the second joint unit and the first joint unit are engaged together to form a first rotary joint.

The support arm, a fourth joint unit is set on its front end, a fifth joint unit is set on a rear end of the support arm, the fourth joint unit and the third joint unit are engaged together to form a second rotary joint.

The sliding element, a sixth joint unit is set on a front end of the sliding element, the sixth' joint unit and the fifth joint unit of the support arm are engaged together to form a third rotary joint.

The base, an adhesive paste is set on its bottom side for adhering on a windshield, and a chute set above the base is provided for the display unit to slide fixedly.

The display module further includes a control unit, a wireless unit, a speaker unit and a voice picking unit, each unit is electrically connected to the circuit board.

The reflective sheet is a concave mirror with translucent and semi-reflective effect.

The base, an adhesive paste set on its bottom side is adhered on a windshield.

The base, a magnetic metal sheet is set on it, a magnet is set on a rear end of the support arm.

The base plate, a slide rail is set on it, and the rear end of the support arm is embedded into the slide rail of the base plate.

The first rotary joint of the present invention is a universal steering joint, the second rotary joint is a universal steering joint, the third rotary joint is a universal steering joint, the first and fifth joint units are spherical structures; the second and sixth joint units are concave structures; the third and fourth joint units are shaft structures.

The first rotary joint of the present invention is a universal steering joint, the second rotary joint is a universal steering joint, the third rotary joint is a universal steering joint, the first and sixth joint units are spherical structures; the second and fifth joint units are concave structures; the third and fourth joint units are shaft structures.

The first rotary joint of the present invention is a universal steering joint, the second rotary joint is a universal steering joint, the third rotary joint is a shaft structure, the first and third joint units are spherical structures; the second and fourth joint units are concave structures; the fifth and sixth joint units are shaft structures.

The first rotary joint of the present invention is a universal steering joint, the second rotary joint is a universal steering joint, the third rotary joint is a shaft structure, the first and fourth joint units are spherical structures; the second and third joint units are concave structures; the fifth and sixth joint units are shaft structures.

The first rotary joint of the present invention is a universal steering joint, the second rotary joint is a universal steering joint, the third rotary joint is a universal steering joint, the first, third and sixth joint units are spherical structures; the second, fourth and fifth joint units are concave structures.

The first rotary joint of the present invention is a universal steering joint, the second rotary joint is a universal steering joint, the third rotary joint is a universal steering joint, the first, third and fifth joint units are spherical structures; the second, fourth and sixth joint units are concave structures.

The first rotary joint of the present invention is a universal steering joint, the second rotary joint is a universal steering joint, the third rotary joint is a universal steering joint, the first, fourth and sixth joint units are spherical structures; the second, third and fifth joint units are concave structures.

The first rotary joint of the present invention is a universal steering joint, the second rotary joint is a universal steering joint, the third rotary joint is a universal steering joint, the first, fourth and fifth joint units are spherical structures; the second, third and sixth joint units are concave structures.

DETAILED DESCRIPTION OF THE INVENTION

Please refer to FIG. 1 to FIG. 5, which is the first embodiment of the separate head-up display device of the present invention, including:

a display module 1, which includes a display unit 11, a base 12 and a circuit board 13, an adhesive paste 121 is set on a bottom side of the base 12 for adhering on a windshield W, the adhesive paste 121 is a double-sided adhesive tape, a chute 122 is set above the base 12, the chute 122 is provided for the display unit 11 to slide fixedly, the circuit board 13 includes a processor 130, the processor 130 is provided to perform data processing and related information and output image information, the display unit 11 electrically connected to the circuit board is provided to receive images output from the circuit board 13 and project images;

a reflective sheet adjustment module 2, which includes a reflective sheet 21 and a base plate 22.

The reflective sheet 21 is a concave mirror with translucent and semi-reflective effect, the reflective sheet 21 is provided to enlarge a virtual image by using features of a concave mirror, let the distance of the virtual image become far at the same ratio and reflect the images projected from the display module 11, a first joint unit 211 is set on a side of the reflective sheet 21.

The base 22, an adhesive paste set on its bottom side is adhered on a windshield W, a second joint unit 221 is set on a side of the base plate, the second joint unit 221 and the first joint unit 211 of the reflective sheet 21 are engaged together to form a first rotary joint A; so that the reflective sheet 21 connected to the first rotary joint A is provided to rotate vertically and horizontally at a limited degree, drivers may easily adjust its direction to obtain an optimal viewing angle.

Figure 1:
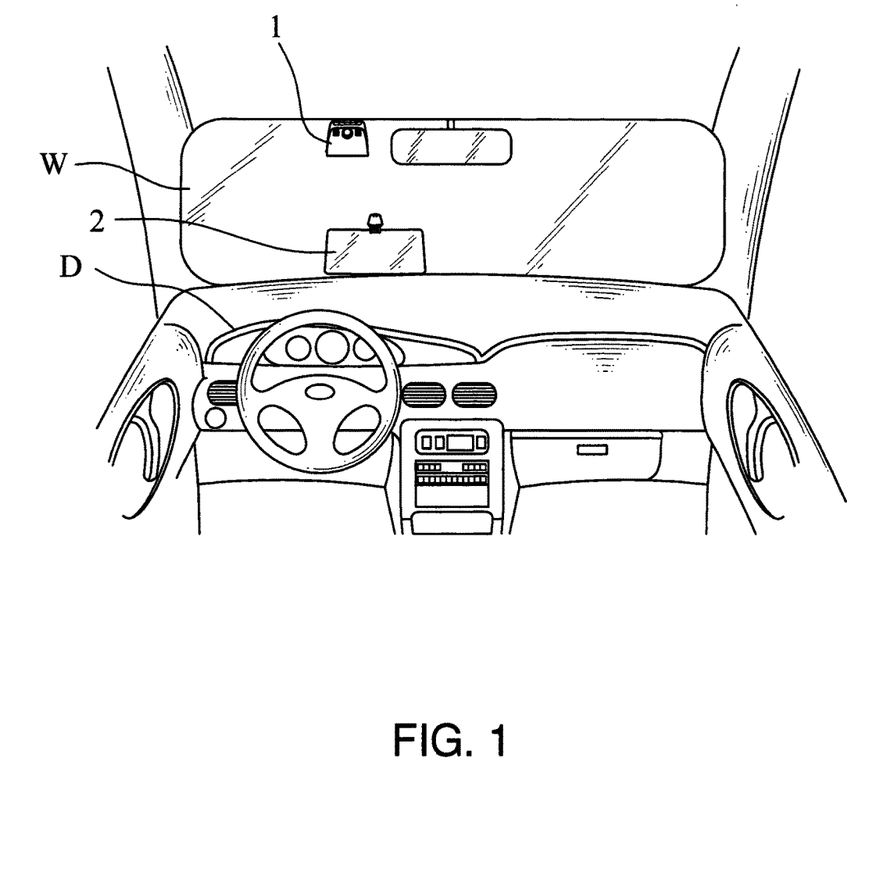
FIG. 1 is an implementation schematic diagram of installing the separate head-up display device on a vehicle according to the present invention.
Figure 2:
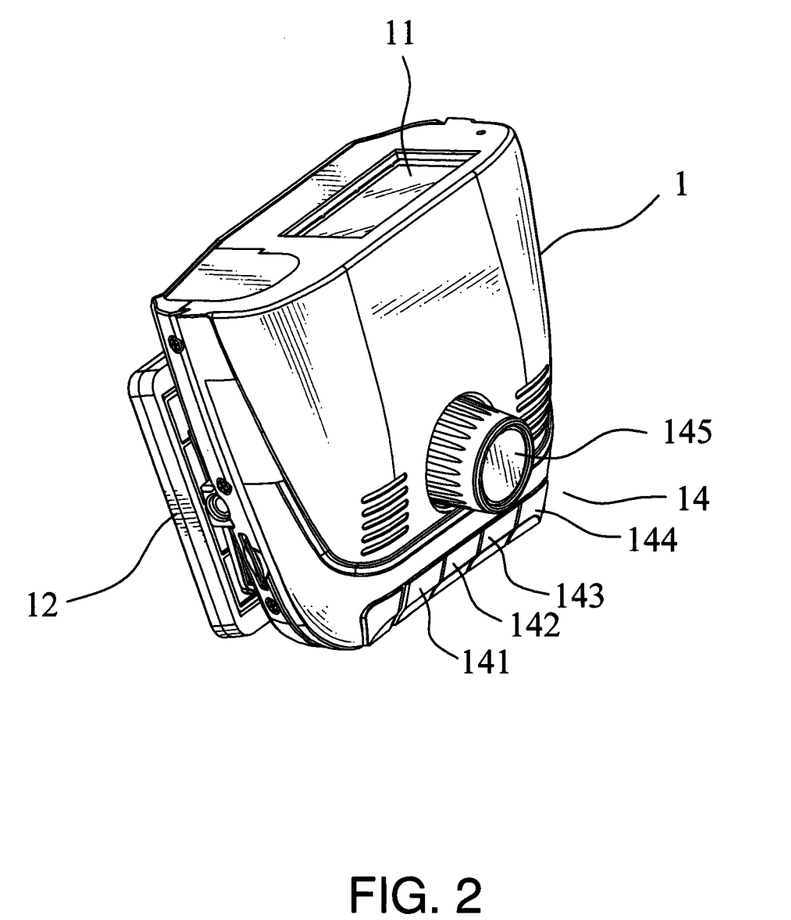
FIG. 2 is a three-dimensional schematic diagram of the display module of the present invention.
Figure 3:
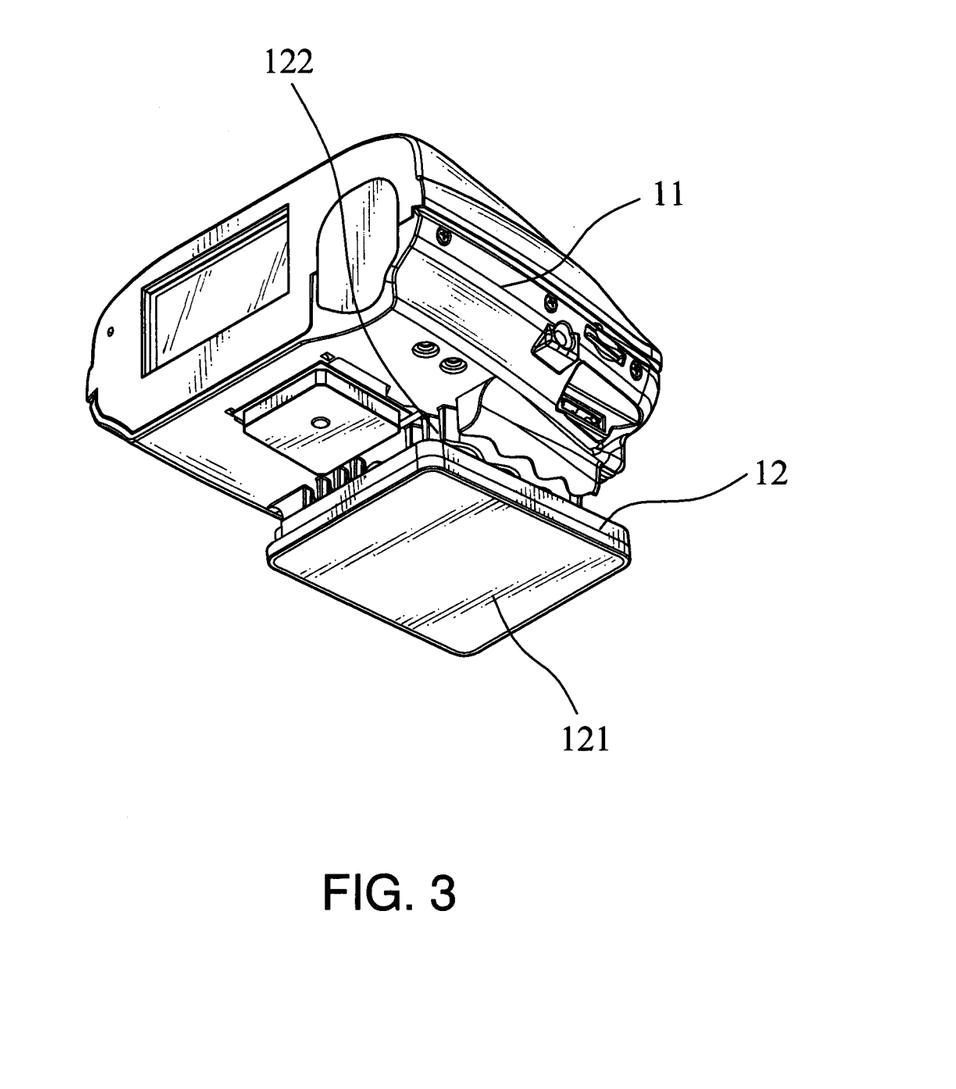
FIG. 3 is a three-dimensional schematic diagram of the base of the present invention.
Figure 4:
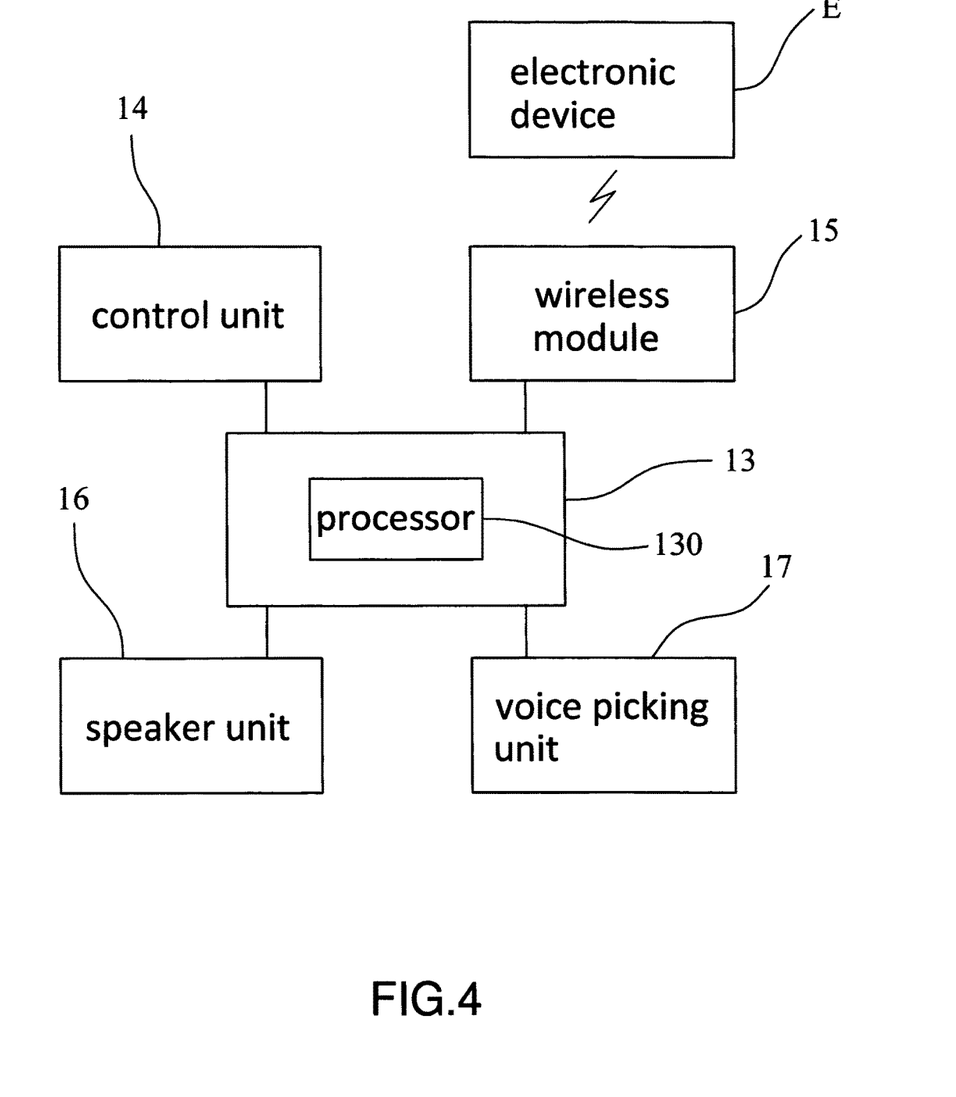
FIG. 4 is a block diagram of the circuit board of the present invention.

As shown in FIG. 4, the display module 1 of the present invention further includes a control unit 14, a wireless unit 15, a speaker unit 16 and a voice picking unit 17.

The control unit 14, which is set on the display module 1, is electrically connected to the circuit board 13. The control unit 14 is provided as a function control unit of the separate head-up display device; the control unit 14 includes a power key 141, a play key 142, an image switching key 143, a speaking key 144 and a knob 145; the power key 141 is provided to start the display module 1; the play key is provided to play music files; the image switching key 143 is provided to switch images output from the circuit board 13, such as a navigation image, a setting image; the speaking key 144 is provided for a speakerphone; the knob 145 is an adjustment knob, volume could be increased by rotating the knob 145 right to let the sound louder, volume could be decreased by rotating the knob 145 left to let the sound smaller.

The wireless module 15 is provided to receive signal data from the electronic device E by wireless transmission. The wireless module 15 is Bluetooth or Wi-Fi. The electronic device E is a vehicle device, a vehicle host, a vehicle audio device, a ceiling multimedia player, a headrest multimedia player, a hands-free device, a navigation device, a tire pressure detector, a smart phone or a tablet. Vehicle speed may be displayed if the electronic device E of a vehicle is connected to the wireless unit 15 by wireless transmission. Signals, such as vehicle battery power, vehicle doors closed or not, a trunk lid closed or not, vehicle speed, road speed limit, navigation instructions, may be shown as displayed image information. Tire pressure may be shown if it is a tire pressure detector. Various information sent by phone apps, except vehicle speed, could also be displayed if a smart phone is connected, such as wireless transmission from a mobile phone music player to the wireless module 15.

The speaker unit 16 is electrically connected to the circuit 13, the speaker unit 16 is provided to inform the driver by voice information and play voice files sent from the electronic device E or warning sounds.

The voice picking unit 17 is electrically connected to the circuit board 13, the voice picking unit 17 is provided to receive voice message for using as a speakerphone.

Figure 5:
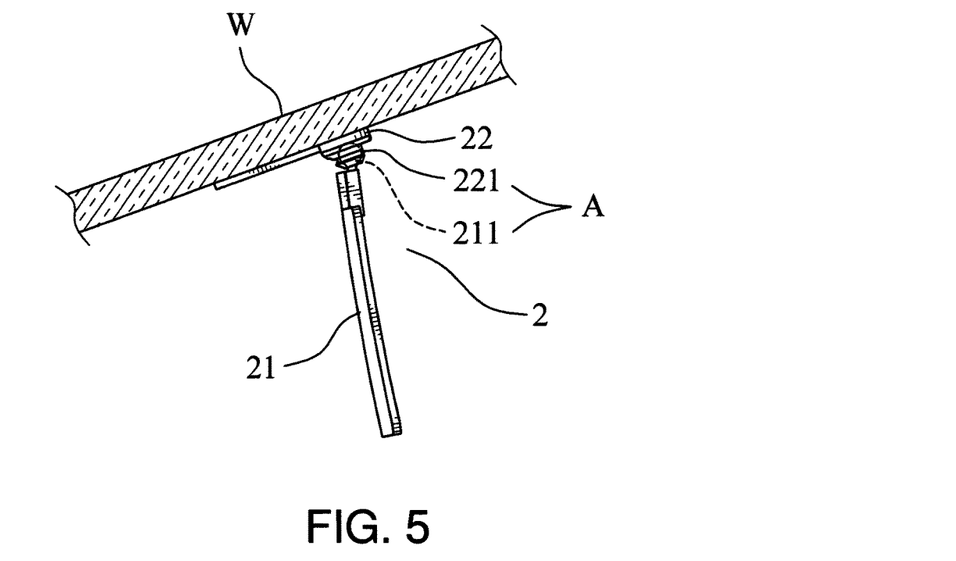
FIG. 5 is a schematic diagram of the first embodiment of the separate head-up display device of the present invention.

As shown in FIG. 5, the rotary joint A is a universal steering joint, the first joint unit 211 is a spherical structure; the second joint unit 221 is a concave structure.

Figure 6:
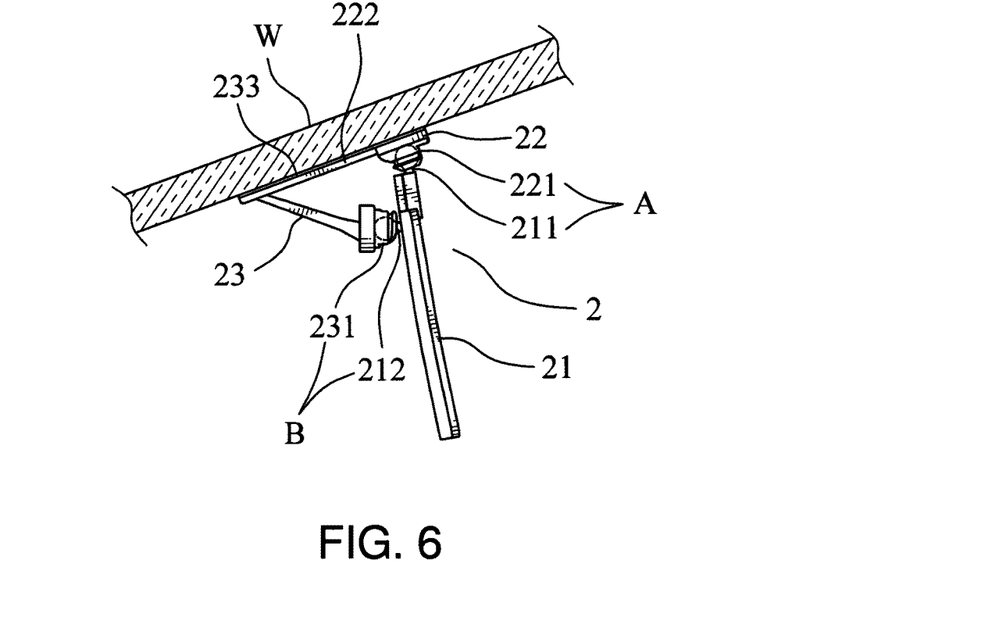
FIG. 6 is a schematic diagram of the second embodiment of the separate head-up display device of the present invention.
Figure 7:
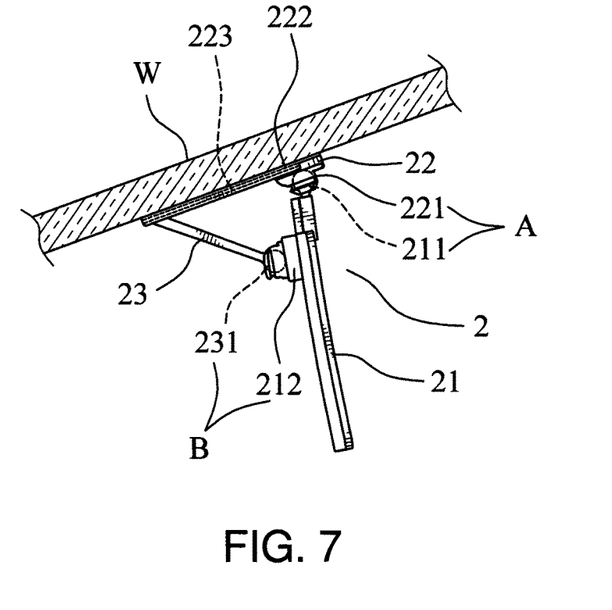
FIG. 7 is a schematic diagram of another implementation of the second embodiment of the separate head-up display device of the present invention.

As shown in FIG. 1 to FIG. 4 and FIG. 6, FIG. 7, which is the second embodiment of the separate head-up display device of the present invention, including:

a display module 1, which includes a display unit 11, a base 12 and a circuit board 13, an adhesive paste 121 is set on a bottom side of the base 12 for adhering on a windshield W, the adhesive paste 121 is a double-sided adhesive tape, a chute 122 is set above the base 12, the chute 122 is provided for the display unit 11 to slide fixedly, the circuit board 13 includes a processor 130, the processor 130 is provided to perform data processing and related information and output image information, the display unit 11 electrically connected to the circuit board is provided to receive images output from the circuit board 13 and project images;

a reflective sheet adjustment module 2, which includes a reflective sheet 21, a base plate 22 and a support arm 23.

The reflective sheet 21 is a concave mirror with translucent and semi-reflective effect, the reflective sheet 21 is provided to enlarge a virtual image by using features of a concave mirror, let the distance of the virtual image become far at the same ratio and reflect the images projected from the display module 11, a first joint unit 211 and a third joint unit 212 are set on a side of the reflective sheet 21.

The base 22, an adhesive paste 121 set on its bottom side is adhered on a windshield W, a second joint unit 221 is set on a side of the base plate 22, the second joint unit 221 and the first joint unit 211 of the reflective sheet 21 are engaged together to form a first rotary joint A.

The support arm 23, a fourth joint unit 231 is set on its front end, the fourth joint unit 231 and the third joint unit 212 of the reflective sheet 21 are engaged together to form a second rotary joint B; so that the reflective sheet 21 connected to the second rotary joint B is provided to rotate vertically and horizontally at a limited degree, drivers may easily adjust its direction to obtain an optimal viewing angle.

As shown in FIG. 4, the display module 1 of the present invention further includes a control unit 14, a wireless unit 15, a speaker unit 16 and a voice picking unit 17.

The control unit 14, which is set on the display module 1, is electrically connected to the circuit board 13. The control unit 14 is provided as a function control unit of the separate head-up display device; the control unit 14 includes a power key 141, a play key 142, an image switching key 143, a speaking key 144 and a knob 145; the power key 141 is provided to start the display module 1; the play key is provided to play music files; the image switching key 143 is provided to switch images output from the circuit board 13, such as a navigation image, a setting image; the speaking key 144 is provided for a speakerphone; the knob 145 is an adjustment knob, volume could be increased by rotating the knob 145 right to let the sound louder, volume could be decreased by rotating the knob 145 left to let the sound smaller.

The wireless module 15 is provided to receive signal data from the electronic device E by wireless transmission. The wireless module 15 is Bluetooth or Wi-Fi. The electronic device E is a vehicle device, a vehicle host, a vehicle audio device, a ceiling multimedia player, a headrest multimedia player, a hands-free device, a navigation device, a tire pressure detector, a smart phone or a tablet. Vehicle speed may be displayed if the electronic device E of a vehicle is connected to the wireless unit 15 by wireless transmission. Signals, such as vehicle battery power, vehicle doors closed or not, a trunk lid closed or not, vehicle speed, road speed limit, navigation instructions, may be shown as displayed image information. Tire pressure may be shown if it is a tire pressure detector. Various information sent by phone apps, except vehicle speed, could also be displayed if a smart phone is connected, such as wireless transmission from a mobile phone music player to the wireless module 15.

The speaker unit 16 is electrically connected to the circuit 13, the speaker unit 16 is provided to inform the driver by voice information and play voice files sent from the electronic device E or warning sounds.

The voice picking unit 17 is electrically connected to the circuit board 13, the voice picking unit 17 is provided to receive voice message for using as a speakerphone.

As shown in FIG. 6, a magnetic metal sheet 222 is set on the base plate 22, a magnet 233 is set on a rear end of the support arm 23, the rear end of the support arm 23 could be fixed to the base plate 22 by the attraction of the magnet 233 and the magnetic metal sheet 222 and could be slid by larger power.

As shown in FIG. 7, a slide rail 223 is further set on the base plate 22, the rear end of the support arm 23 is embedded into the slide rail 223 of the base plate 22; the rear end of the support arm 23 is arranged on the slide rail 223 in a sliding way, so that the rear end of the supporting arm 23 could be fixed to the base plate 22 and could be slid by larger power.

As shown in FIG. 6, the first rotary joint A and the second rotary joint B are universal steering joints, the first joint unit 211 and the third joint unit 212 are spherical structures; the second joint unit 221 and the fourth joint unit 231 are concave structures.

As shown in FIG. 7, the first rotary joint A and the second rotary joint B are universal steering joints, the first joint unit 211 and the fourth joint unit 231 are spherical structures; the second joint unit 221 and the third joint unit 212 are concave structures.

As shown in FIG. 1 to FIG. 4 and FIG. 8 to FIG. 15, which is the third embodiment of the separate head-up display device of the present invention, including:

a display module 1, which includes a display unit 11, a base 12 and a circuit board 13, an adhesive paste 121 is set on a bottom side of the base 12 for adhering on a windshield W, the adhesive paste 121 is a double-sided adhesive tape, a chute 122 is set above the base 12, the chute 122 is provided for the display unit 11 to slide fixedly, the circuit board 13 includes a processor 130, the processor 130 is provided to perform data processing and related information and output image information, the display unit 11 electrically connected to the circuit board 13 is provided to receive images output from the circuit board 13 and project images;

a reflective sheet adjustment module 2, which includes a reflective sheet 21, a base plate 22, a support arm 23 and a sliding element 24.

The reflective sheet 21 is a concave mirror with translucent and semi-reflective effect, the reflective sheet 21 is provided to enlarge a virtual image by using features of a concave mirror, let the distance of the virtual image become far at the same ratio and reflect the images projected from the display module 11, a first joint unit 211 and a third joint unit 212 are set on a side of the reflective sheet 21.

The base 22, an adhesive paste 121 set on its bottom side is adhered on a windshield W, a second joint unit 221 is set on a side of the base plate 22, the second joint unit 221 and the first joint unit 211 of the reflective sheet 21 are engaged together to form a first rotary joint A.

The support arm 23, a fourth joint unit 231 is set on its front end, a fifth joint unit 232 is set on a rear end of the support arm 23, the fourth joint unit 231 and the third joint unit 212 of the reflective sheet 21 are engaged together to form a second rotary joint B.

The sliding element 24, a sixth joint unit 241 is set on its front end, the sixth joint unit 241 and the fifth joint unit 232 of the support arm 23 are engaged together to form a third rotary joint C; so that the reflective sheet 21 connected to the third rotary joint C is provided to rotate vertically and horizontally at a limited degree, drivers may easily adjust its direction to obtain an optimal viewing angle.

As shown in FIG. 4, the display module 1 of the present invention further includes a control unit 14, a wireless unit 15, a speaker unit 16 and a voice picking unit 17.

The control unit 14, which is set on the display module 1, is electrically connected to the circuit board 13. The control unit 14 is provided as a function control unit of the separate head-up display device; the control unit 14 includes a power key 141, a play key 142, an image switching key 143, a speaking key 144 and a knob 145; the power key 141 is provided to start the display module 1; the play key is provided to play music files; the image switching key 143 is provided to switch images output from the circuit board 13, such as a navigation image, a setting image; the speaking key 144 is provided for a speakerphone; the knob 145 is an adjustment knob, volume could be increased by rotating the knob 145 right to let the sound louder, volume could be decreased by rotating the knob 145 left to let the sound smaller.

The wireless module 15 is provided to receive signal data from the electronic device E by wireless transmission. The wireless module 15 is Bluetooth or Wi-Fi. The electronic device E is a vehicle device, a vehicle host, a vehicle audio device, a ceiling multimedia player, a headrest multimedia player, a hands-free device, a navigation device, a tire pressure detector, a smart phone or a tablet. Vehicle speed may be displayed if the electronic device E of a vehicle is connected to the wireless unit 15 by wireless transmission. Signals, such as vehicle battery power, vehicle doors closed or not, a trunk lid closed or not, vehicle speed, road speed limit, navigation instructions, may be shown as displayed image information. Tire pressure may be shown if it is a tire pressure detector. Various information sent by phone apps, except vehicle speed, could also be displayed if a smart phone is connected, such as wireless transmission from a mobile phone music player to the wireless module 15.

The speaker unit 16 is electrically connected to the circuit 13, the speaker unit 16 is provided to inform the driver by voice information and play voice files sent from the electronic device E or warning sounds.

The voice picking unit 17 is electrically connected to the circuit board 13, the voice picking unit 17 is provided to receive voice message for using as a speakerphone.

Figure 8:
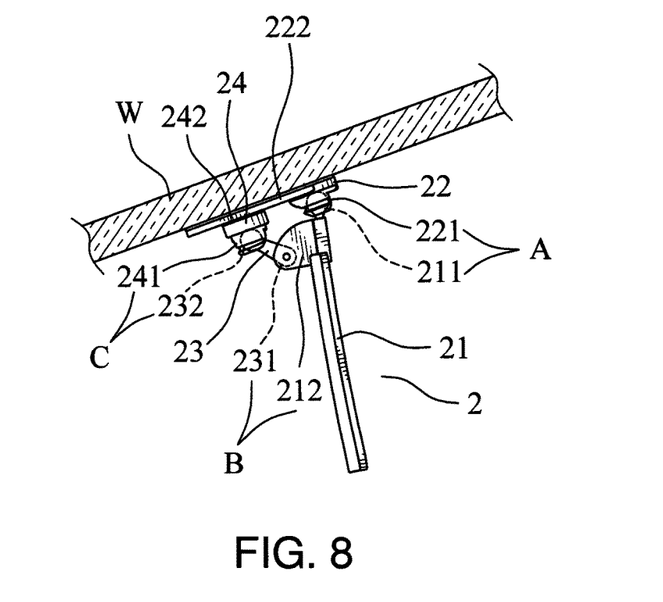
FIG. 8 is a schematic diagram of the third embodiment of the separate head-up display device of the present invention.

As shown in FIG. 8, a magnetic metal sheet 222 is set on the base plate 22, a magnet 242 is set on a rear end of the sliding element 24, the rear end of the sliding element 24 could be fixed to the base plate 22 by the attraction of the magnet 242 and the magnetic metal sheet 222 and could be slid by larger power.

Figure 9:
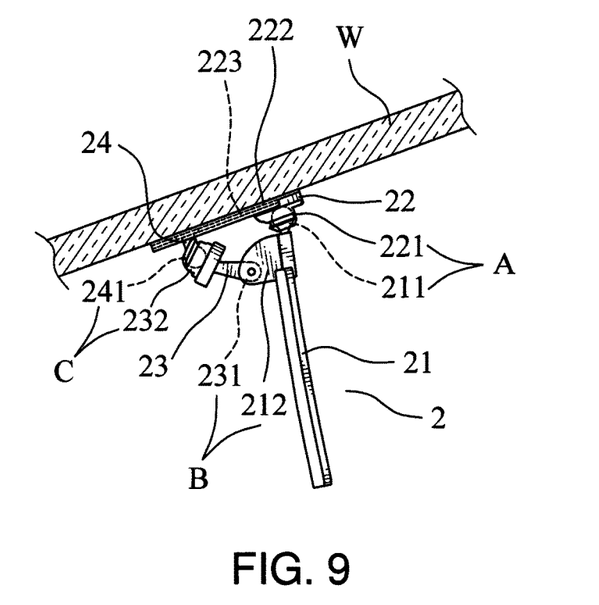
FIG. 9 is a schematic diagram of another implementation (1) of the third embodiment of the separate head-up display device of the present invention.

As shown in FIG. 9, a slide rail 223 is further set on the base plate 22, and the rear end of the sliding element 24 is embedded into the slide rail 223 of the base plate 22; the rear end of the sliding element 24 is arranged on the slide rail 223 in a sliding way, so that the rear end of the sliding element 24 could be fixed to the base plate 22 and could be slid by larger power.

As shown in FIG. 8, the first rotary joint A is a universal steering joint, the second rotary joint B is a shaft structure, the third rotary joint C is a universal steering joint, the first joint unit 211 and the fifth joint unit 232 are spherical structures; the second joint unit 221 and the sixth joint unit 241 are concave structures; the third joint unit 212 and the fourth joint unit 231 are shaft structures.

As shown in FIG. 9, the first rotary joint A is a universal steering joint, the second rotary joint B is a shaft structure, the third rotary joint C is a universal steering joint, the first joint unit 211 and the sixth joint unit 241 are spherical structures; the second joint unit 221 and the fifth joint unit 232 are concave structures; the third joint unit 212 and the fourth joint unit 231 are shaft structures.

Figure 10:
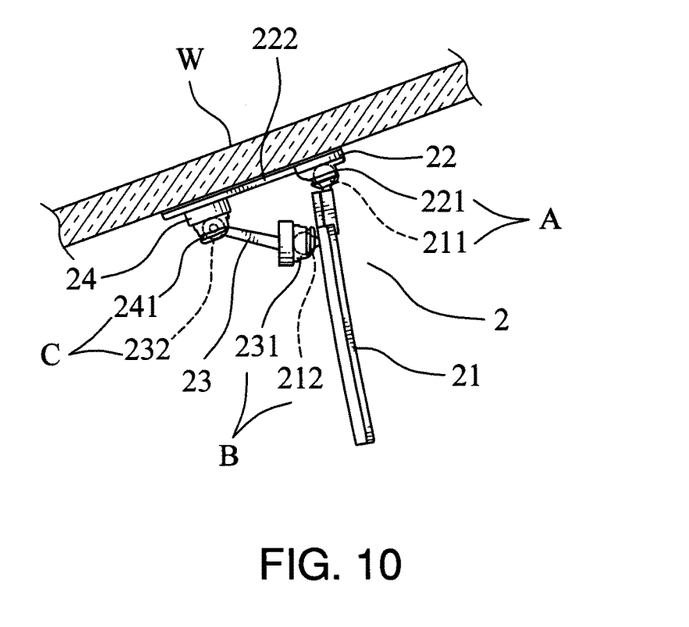
FIG. 10 is a schematic diagram of another implementation (2) of the third embodiment of the separate head-up display device of the present invention.

As shown in FIG. 10, the first rotary joint A is a universal steering joint, the second rotary joint B is a universal steering joint, the third rotary joint C is a shaft structure, the first joint unit 211 and the third joint unit 212 are spherical structures; the second joint unit 221 and the fourth joint unit 231 are concave structures; the fifth joint unit 232 and the sixth joint unit 241 are shaft structures.

Figure 11:
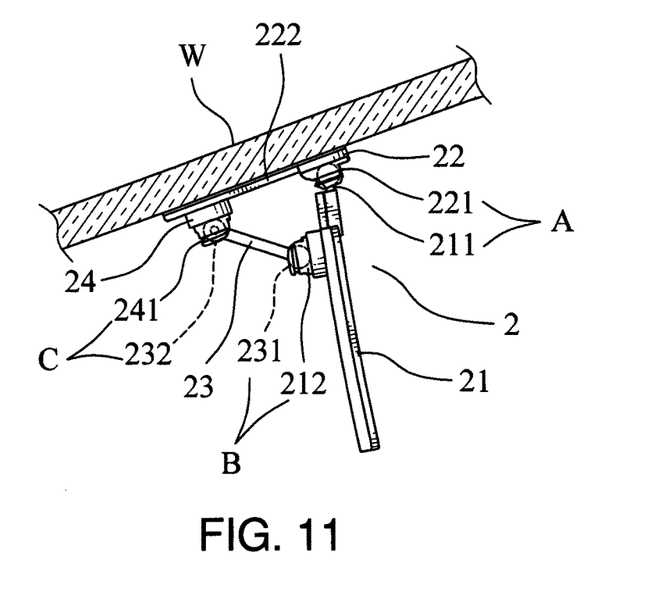
FIG. 11 is a schematic diagram of another implementation (3) of the third embodiment of the separate head-up display device of the present invention.

As shown in FIG. 11, the first rotary joint A is a universal steering joint, the second rotary joint B is a universal steering joint, the third rotary joint C is a shaft structure, the first joint unit 211 and the fourth joint unit 231 are spherical structures; the second joint unit 221 and the third joint unit 212 are concave structures; the fifth joint unit 232 and the sixth joint unit 241 are shaft structures.

Figure 12:
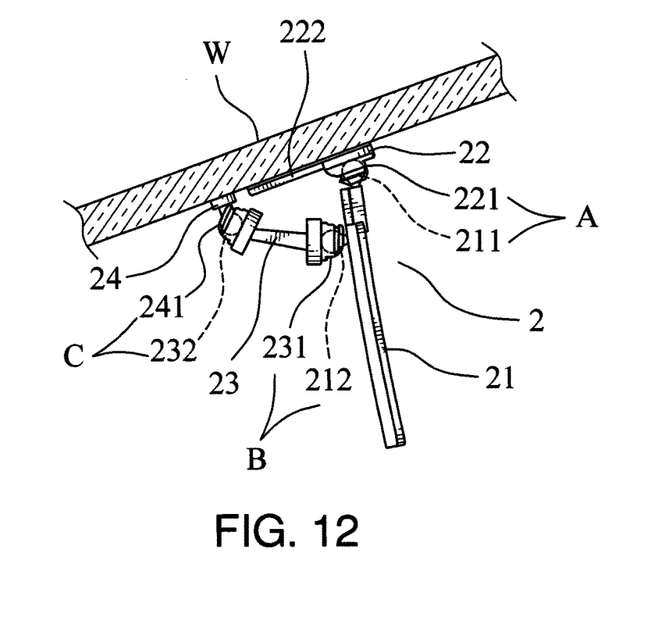
FIG. 12 is a schematic diagram of another implementation (4) of the third embodiment of the separate head-up display device of the present invention.

As shown in FIG. 12, the first rotary joint A is a universal steering joint, the second rotary joint B is a universal steering joint, the third rotary joint C a universal steering joint, the first joint unit 211, the third joint unit 212 and the sixth joint unit 241 are spherical structures; the second joint unit 221, the fourth joint unit 231 and the fifth joint unit 232 are concave structures.

Figure 13:
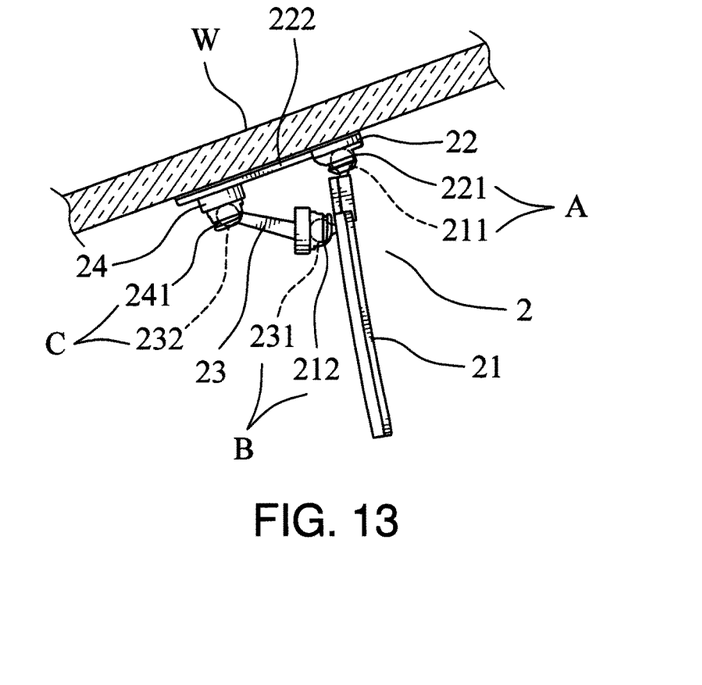
FIG. 13 is a schematic diagram of another implementation (5) of the third embodiment of the separate head-up display device of the present invention.

As shown in FIG. 13, the first rotary joint A is a universal steering joint, the second rotary joint B is a universal steering joint, the third rotary joint C a universal steering joint, the first joint unit 211, the third joint unit 212 and the fifth joint unit 232 are spherical structures; the second joint unit 221, the fourth joint unit 231 and the sixth joint unit 241 are concave structures.

Figure 14:
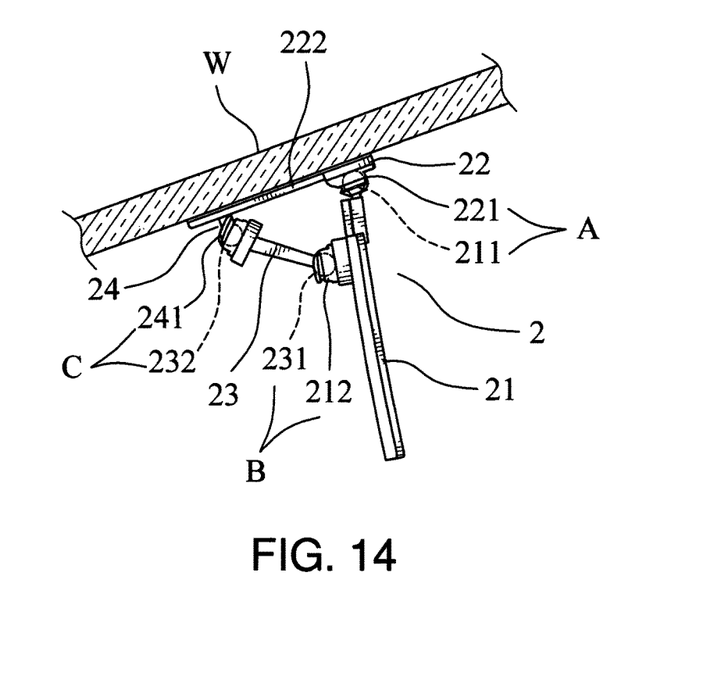
FIG. 14 is a schematic diagram of another implementation (6) of the third embodiment of the separate head-up display device of the present invention.

As shown in FIG. 14, the first rotary joint A is a universal steering joint, the second rotary joint B is a universal steering joint, the third rotary joint C a universal steering joint, the first joint unit 211, the fourth joint unit 231 and the sixth joint unit 241 are spherical structures; the second joint unit 221, the third joint unit 212 and the fifth joint unit 232 are concave structures.

Figure 15:
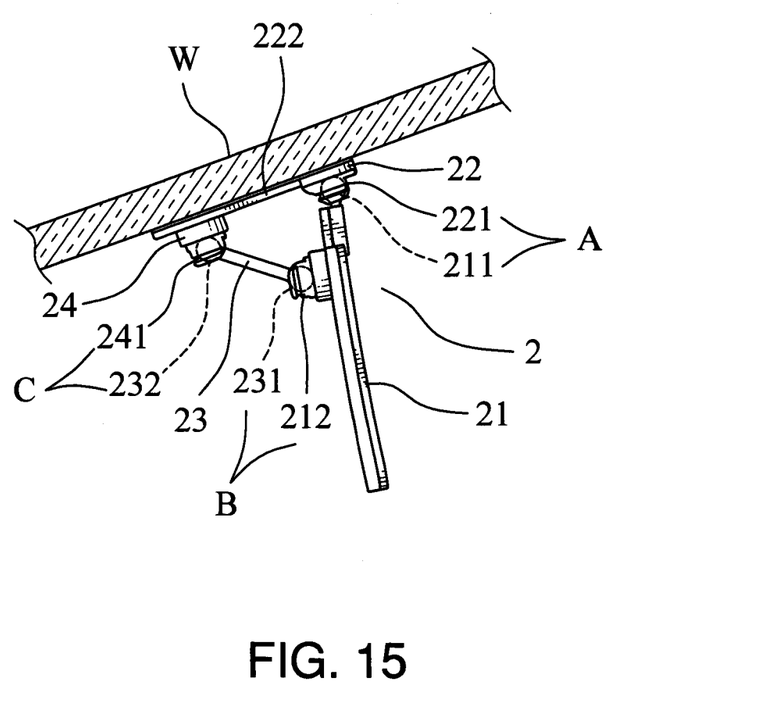
FIG. 15 is a schematic diagram of another implementation (7) of the third embodiment of the separate head-up display device of the present invention.

As shown in FIG. 15, the first rotary joint A is a universal steering joint, the second rotary joint B is a universal steering joint, the third rotary joint C a universal steering joint, the first joint unit 211, the fourth joint unit 231 and the fifth joint unit 232 are spherical structures; the second joint unit 221, the third joint unit 212 and the sixth joint unit 241 are concave structures.

The separate head-up display device, for solving the problem of severe shakes, by the structure of the base plate 22 that an adhesive paste set on the windshield W, the adhesive paste of the base plate 22 is provided to support the weight of the reflective sheet adjustment device 2, to reduce shakes on the reflective sheet 21 fixed to the dashboard D and the windshield W due to different shaking frequencies of the dashboard D and the windshield W. Using the structure of the first, second, third rotary joint A, B, C, a driver may easily adjust the direction of the reflective sheet to obtain an optimal viewing angle, to thereby improve driving safety.

What is claimed is:

1. A separate head-up display device, including:
   a display module, which includes a display unit, a base and a circuit board, the display unit electrically connected to the circuit board is provided to receive images output from the circuit board and project images;
   a reflective sheet adjustment module, which includes a reflective sheet, a base plate, a support arm and a sliding element, the sliding element is selectively connected to and moveable along the base plate, a first joint unit and a third joint unit are connected to a side of the reflective sheet, a second joint unit is connected to a side of the base plate, the second joint unit and the first joint unit are engaged together to form a first rotary joint;
   the support arm, a fourth joint unit is connected to a front end of the support arm, a fifth joint unit is set on a rear end of the support arm, the fourth joint unit and the third joint unit are engaged together to form a second rotary joint;
   the sliding element, a sixth joint unit is connected to a front end of the sliding element, the sixth joint unit and the fifth joint unit of the support arm are engaged together to form a third rotary joint;
   wherein the first rotary joint is connected to the reflective sheet and the base plate, the second rotary joint is connected to the reflect sheet and the support arm, and the third rotary joint is connect to the sliding element and the support arm;
   wherein, when the sliding element is moved to a selected position along the base plate, the sliding element moves the reflection sheet relative to base plate by rotating the third rotary joint, the second rotary joint, and the first rotary joint.

2. The separate head-up display device as claimed in claim 1, wherein an adhesive paste is set on a bottom side of the base for adhering on a windshield, and a chute set above the base is provided for the display unit to slide fixedly.

3. The separate head-up display device as claimed in claim 1, wherein the display module further includes a control unit, a wireless unit, a speaker unit and a voice picking unit, each unit is electrically connected to the circuit board.

4. The separate head-up display device as claimed in claim 1, wherein the reflective sheet is a concave mirror with translucent and semi-reflective effect.

5. The separate head-up display device as claimed in claim 1, wherein an adhesive paste set on a bottom side of the base is adhered on a windshield.

6. The separate head-up display device as claimed in claim 1, wherein a magnetic metal sheet is set on the base plate, a magnet is set on a rear end of the sliding element.

7. The separate head-up display device as claimed in claim 1, wherein a slide rail is set on the base plate, a rear end of the sliding element is embedded into the slide rail of the base plate.

8. The separate head-up display device as claimed in claim 1, wherein the first rotary joint is a universal steering joint, the second rotary joint is a shaft structure, the third rotary joint is a universal steering joint, the first and fifth joint units are spherical structures; the second and sixth joint units are concave structures; the third and fourth joint units are shaft structures.

9. The separate head-up display device as claimed in claim 1, wherein the first rotary joint is a universal steering joint, the second rotary joint is a shaft structure, the third rotary joint is a universal steering joint, the first and sixth joint units are spherical structures; the second and fifth joint units are concave structures; the third and fourth joint units are shaft structures.

10. The separate head-up display device as claimed in claim 1, wherein the first rotary joint is a universal steering joint, the second rotary joint is a universal steering joint, the third rotary joint is a shaft structure, the first and third joint units are spherical structures; the second and fourth joint units are concave structures; the fifth and sixth joint units are shaft structures.

11. The separate head-up display device as claimed in claim 1, wherein the first rotary joint is a universal steering joint, the second rotary joint is a universal steering joint, the third rotary joint is a shaft structure, the first and fourth joint units are spherical structures; the second and third joint units are concave structures; the fifth and sixth joint units are shaft structures.

12. The separate head-up display device as claimed in claim 1, wherein the first rotary joint is a universal steering joint, the second rotary joint is a universal steering joint, the third rotary joint is a universal steering joint, the first, third and sixth joint units are spherical structures; the second, fourth and fifth joint units are concave structures.

13. The separate head-up display device as claimed in claim 1, wherein the first rotary joint is a universal steering joint, the second rotary joint is a universal steering joint, the third rotary joint is a universal steering joint, the first, third and fifth joint units are spherical structures; the second, fourth and sixth joint units are concave structures.

14. The separate head-up display device as claimed in claim 1, wherein the first rotary joint is a universal steering joint, the second rotary joint is a universal steering joint, the third rotary joint is a universal steering joint, the first, fourth and sixth joint units are spherical structures; the second, third and fifth joint units are concave structures.

15. The separate head-up display device as claimed in claim 1, wherein the first rotary joint is a universal steering joint, the second rotary joint is a universal steering joint, the third rotary joint is a universal steering joint, the first, fourth and fifth joint units are spherical structures; the second, third and sixth joint units are concave structures.

* * * * *